Aug. 11, 1936.                W. A. MEYER                2,050,536
                                COMPRESSOR
                            Filed Oct. 10, 1931
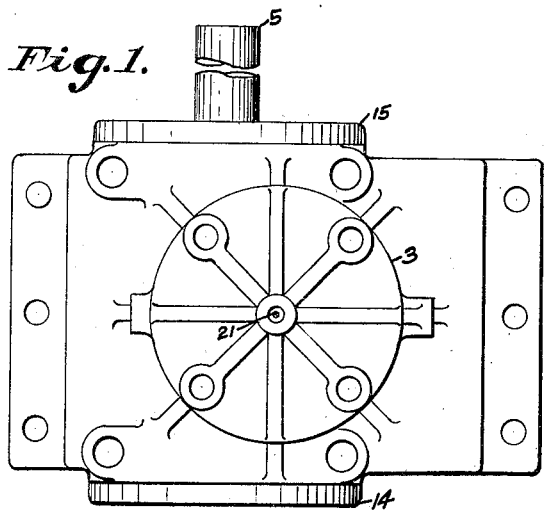
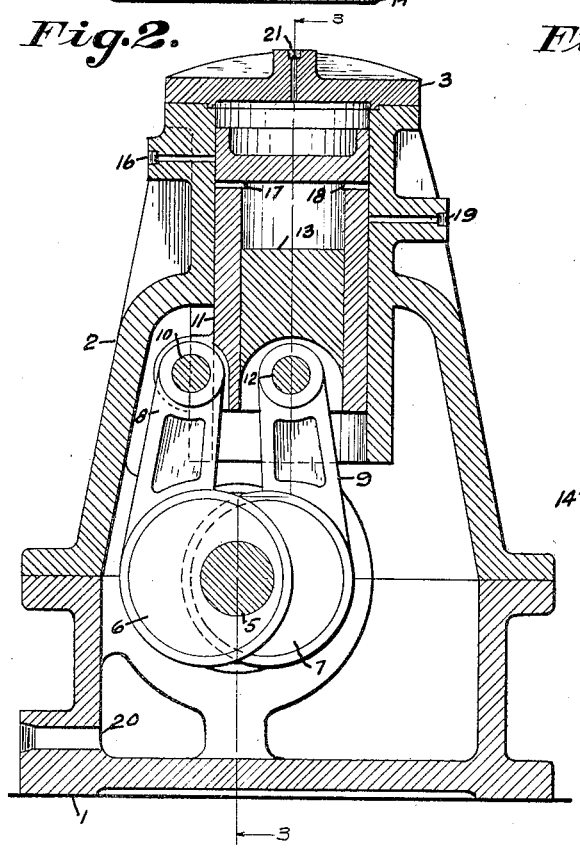
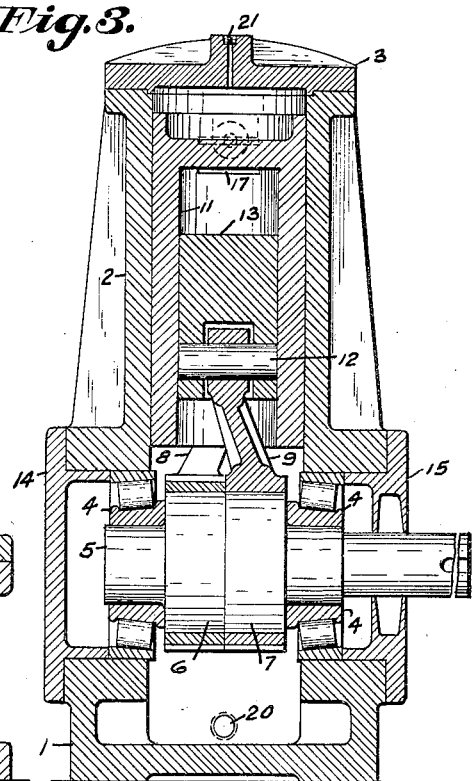
INVENTOR.
William A. Meyer Patented Aug. 11, 1936

2,050,536

UNITED STATES PATENT OFFICE 2,050,536

COMPRESSOR

William A. Meyer, West Allis, Wis.

Application October 10, 1931, Serial No. 567,996

1 Claim. (Cl. 230—179)

This invention relates primarily to compressors of the reciprocating type although certain features thereof may be advantageously employed in motors of the same type.

One object of the present invention is the provision in a machine of the reciprocating piston type of means for effecting reciprocation of a cylinder simultaneously with the coacting piston and in opposite direction so as to permit a reduction in the piston stroke for a given chamber expansion and so as to reduce vibration by balancing the inertia forces of the cylinder against those of the piston.

Another object is to utilize the movement of the cylinder to control the admission and discharge of fluid to and from the cylinder space or chamber through ports provided for the purpose in such manner as to eliminate the necessity for valves such as are ordinarily required in machines of this type.

Other more specific objects and advantages will appear from the following description of an illustrative embodiment of the present invention.

In the accompanying drawing:—

Figure 1 is a top plan view of a compressor constructed in accordance with the teachings of the present invention.

Fig. 2 is a vertical sectional view thereof.

Fig. 3 is a vertical sectional view taken along the line 3—3 of Fig. 2.

The compressor shown comprises a housing or casing having a base 1, forming an oil reservoir, an upright portion 2, and a removable cover 3. A power shaft 5 is journalled in the housing within a pair of spaced radial end thrust bearings 4, fixed in circular bearing supports formed in the housing, and secured in position by appropriate removable end heads 14 and 15.

Between the bearings 4 the shaft 5 is provided with two circular eccentrics 6 and 7 fixed to rotate therewith and each set at an angle of one hundred eighty degrees with respect to the other. Eccentric 6 is rotatable within a circular fitting carried by the lower end of a connecting rod 8; and eccentric 7 is rotatable within a circular fitting carried by the lower end of a connecting rod 9. The rod 8 is rockably supported at its upper end upon a pin 10, fixed in appropriate ears which project from the side of a cylinder 11; and rod 9 is rockably mounted at its upper end upon a similar pin 12 fixed in the lower end of a piston 13.

The arrangement is such that when the shaft 5 is rotated the cylinder 11 is reciprocated longitudinally within the housing portion 2 and the piston 13 is simultaneously reciprocated longitudinally within the cylinder 11 but in opposite directions. The cylinder space or compression chamber formed by and between the piston 13 and the upper end head of the cylinder 11 is thus contracted during the down stroke of the cylinder and the simultaneous up stroke of the piston and is expanded during the up stroke of the cylinder and the simultaneous down stroke of the piston.

Fluid to be compressed is admitted to the compression space of the cylinder 11 through a horizontally extended slotted port 17 and the compressed fluid is discharged through a similar port 18, preferably formed in the diametrically opposite side of the cylinder. Port 17 registers with a supply passage 16 when the cylinder is at the upper limit of its stroke; and port 18 registers with a discharge passage 19 when the cylinder reaches the lower limit of its stroke. During the down stroke of the cylinder the supply passage 16 is closed by an end flange or apron formed on the upper end of the cylinder. A vent passage 21 formed in the cover 3 prevents the formation of pressure within that chamber above the cylinder 11 during reciprocation thereof.

The operation of the compressor shown is as follows:—During the up stroke of the cylinder 11 and simultaneous down stroke of the piston 13, ports 17 and 18 are closed so that a partial vacuum is established in the chamber above the piston, until port 17 communicates with the supply passage 16, whereupon that chamber is immediately filled with fluid to be compressed. Thereafter, during the down stroke of the cylinder 11 and the simultaneous up stroke of the piston 13, the ports 17 and 18 are again closed and the contents of the chamber is compressed until port 18 communicates with the discharge passage, whereupon the contents of the chamber is discharged.

Various changes may be made in the embodiment of the invention hereinabove specifically described without departing from or sacrificing the advantages of the invention as defined in the appended claims.

I claim:—

In a machine of the character described, the combination of a housing, a cylinder longitudinally reciprocable therein and having an end head movable therewith, a piston longitudinally reciprocable in said cylinder and cooperating with said end head to form a compression space, a power shaft journalled in said housing, two eccentric driving means on said shaft, a connecting